United States Patent
Chen et al.

(10) Patent No.: US 12,541,651 B2
(45) Date of Patent: Feb. 3, 2026

(54) SYSTEM AND METHOD FOR INFERRING PSYCHOLOGICAL COMPLEXITY ELICITED BY VISUAL STIMULI

(71) Applicant: TOYOTA RESEARCH INSTITUTE, INC., Los Altos, CA (US)

(72) Inventors: Yin-Ying Chen, San Jose, CA (US); Shabnam Hakimi, San Francisco, CA (US); Monica PhuongThao Van, Berkeley, CA (US); Matthew Kyung-Soo Hong, Mountain View, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 336 days.

(21) Appl. No.: 18/334,132

(22) Filed: Jun. 13, 2023

(65) Prior Publication Data
US 2024/0419914 A1    Dec. 19, 2024

(51) Int. Cl.
*G06F 40/35*    (2020.01)
*G06N 20/00*    (2019.01)

(52) U.S. Cl.
CPC .............. *G06F 40/35* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 8,602,789 B2 | 12/2013 | Hallowell et al. | |
| 9,558,499 B2 | 1/2017 | Forbes | |
| 9,904,869 B2 | 2/2018 | Wang et al. | |
| 11,423,189 B2 | 8/2022 | Dalloro et al. | |
| 2004/0049124 A1 | 3/2004 | Kullok et al. | |
| 2021/0312942 A1* | 10/2021 | Rudzicz | A61B 5/4803 |
| 2021/0326494 A1 | 10/2021 | White | |
| 2023/0108067 A1* | 4/2023 | Shimpi | G06Q 30/016 704/9 |

FOREIGN PATENT DOCUMENTS

WO    2022097457 A1    5/2022

* cited by examiner

*Primary Examiner* — Antim G Shah
(74) *Attorney, Agent, or Firm* — SEYFARTH SHAW LLP

(57) ABSTRACT

A method for quantitatively measuring a psychological complexity of a response to visual stimuli is described. The method includes generating, by a trained machine learning model, different dataset types of reference text descriptions and/or representations of the visual stimuli. The method also includes collecting input response text descriptions from an individual after perceiving the visual stimuli. The method further includes scoring a difference between the input response text descriptions and the different dataset types of reference text descriptions and/or representations of the visual stimuli, in which a score is generated based on the different dataset types of reference text descriptions. The method also includes generating a complexity score representative of a cognitive complexity of the input response text description from the individual based on the score generated based on the different dataset types of reference text descriptions.

20 Claims, 6 Drawing Sheets

SYSTEM AND METHOD FOR INFERRING PSYCHOLOGICAL COMPLEXITY ELICITED BY VISUAL STIMULI

BACKGROUND

Field

Certain aspects of the present disclosure generally relate to machine learning and, more particularly, to a system and method for inferring psychological complexity elicited by visual stimuli.

Background

Procedures for eliciting signals from humans for visual stimuli are essential to human-centered applications in multiple domains, including market research and design. One important signal is the complexity of the psychological process that arises when a person is presented with visual stimuli such as images, videos, virtual reality content, and physical artifacts. Modeling complexity may help researchers and designers make inferences about how humans differ in their understanding of concepts, their preferences, the way they encode their memories, and how they imagine possible futures. Complexity, while important, however, is nonetheless abstract and is, therefore, very challenging to measure quantitatively.

A machine learning based approach to quantitatively measure the psychological complexity in at least three perspectives: (1) how well humans can imagine concepts beyond the visual stimuli, (2) the complexity of human's descriptions of visual stimuli, and (3) the scope of affective information contained in the language used in descriptions of visual stimuli, is desired.

SUMMARY

A method for quantitatively measuring a psychological complexity of a response to visual stimuli is described. The method includes generating, by a trained machine learning model, different dataset types of reference text descriptions and/or representations of the visual stimuli. The method also includes collecting input response text descriptions from an individual after perceiving the visual stimuli. The method further includes scoring a difference between the input response text descriptions and the different dataset types of reference text descriptions and/or representations of the visual stimuli, in which a score is generated based on the different dataset types of reference text descriptions. The method also includes generating a complexity score representative of a cognitive complexity of the input response text description from the individual based on the score generated based on the different dataset types of reference text descriptions.

A non-transitory computer-readable medium having program code recorded thereon for quantitatively measuring a psychological complexity of a response to visual stimuli is described. The program code is executed by a processor. The non-transitory computer-readable medium includes program code to generate, by a trained machine learning model, a plurality of different dataset types of reference text descriptions and/or representations of the visual stimuli. The non-transitory computer-readable medium also includes program code to collect input response text descriptions from an individual after perceiving the visual stimuli. The non-transitory computer-readable medium further includes program code to score a difference between the input response text descriptions and the plurality of different dataset types of reference text descriptions and/or representations of the visual stimuli, in which a score is generated based on the plurality of different dataset types of reference text descriptions. The non-transitory computer-readable medium also includes program code to generate a complexity score representative of a cognitive complexity of the input response text description from the individual based on the score generated based on the plurality of different dataset types of reference text descriptions.

A system for quantitatively measuring a psychological complexity of a response to visual stimuli is described. The system includes a reference description generation model to generate a plurality of different dataset types of reference text descriptions and/or representations of the visual stimuli. The system also includes an input response description module to collect input response text descriptions from an individual after perceiving the visual stimuli. The system further includes a description scoring module to score a difference between the input response text descriptions and the plurality of different dataset types of reference text descriptions and/or representations of the visual stimuli, in which a score is generated based on the plurality of different dataset types of reference text descriptions. The system also includes a cognitive complexity score module to generate a complexity score representative of a cognitive complexity of the input response text description from the individual based on the score generated based on the plurality of different dataset types of reference text descriptions.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
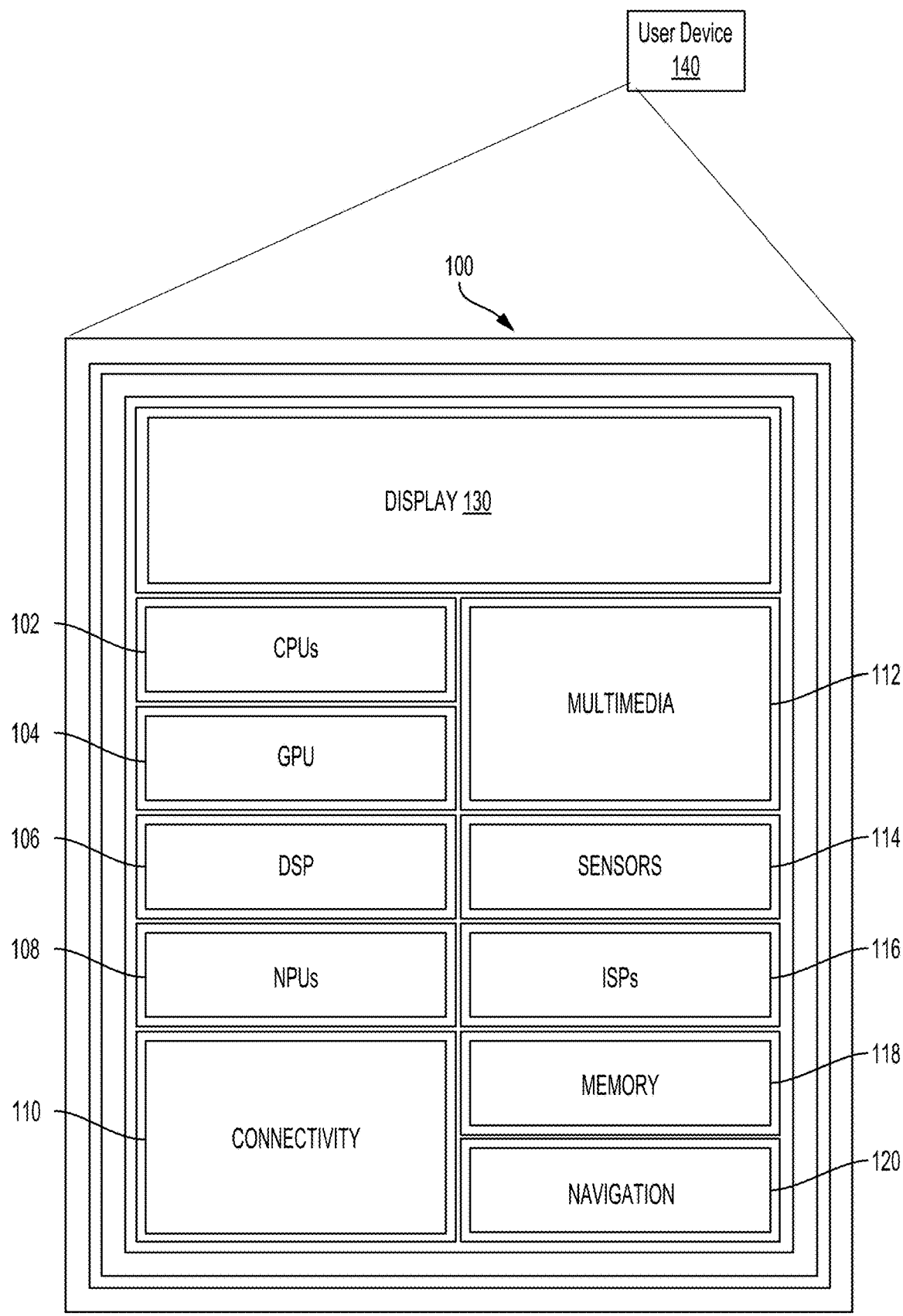
FIG. 1 illustrates an example implementation of designing a neural network using a system-on-a-chip (SOC) of a cognitive complexity measurement system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Procedures for eliciting signals from humans for stimuli are essential to human-centered applications in multiple domains, including market research and design. One important signal is the complexity of the psychological process that arises when a person is presented with visual stimuli such as images, videos, virtual reality content, and physical artifacts. As described, complexity is defined as the extent to which an individual's psychological representation of a stimulus differs from a normative representation of the stimulus. Differences between the individual's psychological representation and the normative representation of the stimulus are primarily driven by the visual perceptual characteristics of the stimulus. Modeling complexity may help researchers and designers make inferences about how humans differ in their understanding of concepts, their preferences, the way they encode their memories, and how they imagine possible futures. Complexity, while important, however, is nonetheless abstract and is, therefore, very challenging to measure quantitatively.

Various aspects of the present disclosure are directed to a machine learning based approach to quantitatively measure the psychological complexity in at least three perspectives: (1) how well humans can imagine concepts beyond the visual stimuli, (2) the complexity of human's descriptions of visual stimuli, and (3) the scope of affective information contained in the language used in descriptions of visual stimuli. In particular, various aspects of the present disclosure are directed to a system designed to quantify the complexity of human psychological processes elicited by visual stimuli using a machine learning-based approach. In these various aspects of the present disclosure, metrics generated by the system allow the user to make inference about how a human understands the visual world.

Furthermore, cognitive complexity can provide insight into how people make decisions, ranging from the most minor to the most impactful. Various aspects of the present disclosure are directed to a novel approach of inferring the complexity of processes associated with preference and decision making. Some aspects of the present disclosure measure the complexity of participant-generated descriptive features of consumer products and the relationship to preference rankings. These aspects of the present disclosure rely on a natural language processing approach that compares the descriptive words generated by participants to those generated by a machine learning model to measure cognitive complexity over a sparse set of features. For example, words that were more distinct from those generated by the model were rated more complex. These aspects of the present disclosure recognize that cognitive complexity is related to preference for products, explaining unique variance in rankings and also capturing a new facet of the process through which preference is revealed through choice.

FIG. 1 illustrates an example implementation of the aforementioned system and method for a cognitive complexity measurement system using a system-on-a-chip (SOC) 100, according to aspects of the present disclosure. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a control action, according to the display 130 illustrating a view of a user device.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risk Machine (ARM) instruction set or the like. In another aspect of the present disclosure, the SOC 100 may be a server computer in communication with a user device 140. In this arrangement, the user device 140 may include a processor and other features of the SOC 100.

In this aspect of the present disclosure, instructions loaded into a processor (e.g., CPU 102) or the NPU 108 of the user device 140 may direct the user device 140 to quantitatively measure a psychological complexity of a response to visual stimuli. The instructions loaded into a processor (e.g., NPU 108) may include code to generate different dataset types of reference text descriptions and/or representations of visual stimuli using a trained machine learning model. The instructions loaded into a processor (e.g., NPU 108) may also include code to collect input response text descriptions from an individual after perceiving the visual stimuli. The instructions loaded into a processor (e.g., NPU 108) may also include code to score a difference between the input response text descriptions and the different dataset types of the reference text descriptions and/or representations of the visual stimuli, in which a score is generated based on the plurality of different dataset types. The instructions loaded into a processor (e.g., NPU 108) may also include code to generate a complexity score representative of a cognitive complexity of the input response text description from the individual based on the score generated based on the plurality of different dataset types.

Figure 2:
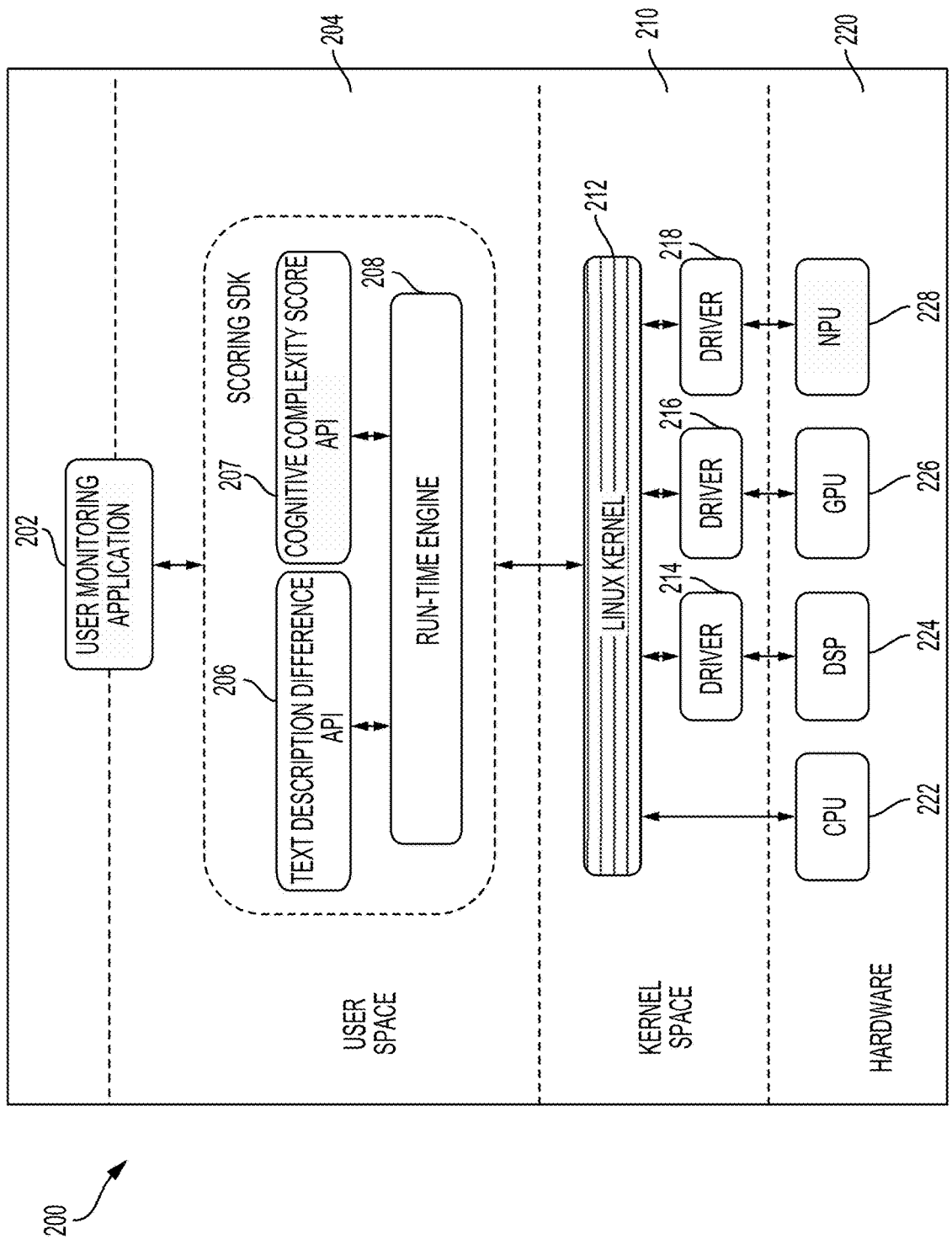
FIG. 2 is a block diagram illustrating an exemplary software architecture that may modularize artificial intelligence (AI) functions for a cognitive complexity measurement system, according to aspects of the present disclosure.

FIG. 2 is a block diagram illustrating a software architecture 200 that may modularize artificial intelligence (AI) functions for a cognitive complexity measurement system, according to aspects of the present disclosure. Using the architecture, a user monitoring application 202 may be designed such that it may cause various processing blocks of an SOC 220 (for example a CPU 222, a DSP 224, a GPU 226, and/or an NPU 228) to perform supporting computations during run-time operation of the user monitoring application 202. FIG. 2 describes the software architecture 200 for cognitive complexity and psychological complexity measurement. It should be recognized that the cognitive complexity measurement system is not limited to text description discrepancies. According to aspects of the present disclosure, the cognitive complexity measurement functionality is applicable to any type of user activity.

The user monitoring application 202 may be configured to call functions defined in a user space 204 that may, for example, provide for cognitive complexity measurement services. The user monitoring application 202 may make a request for compiled program code associated with a library defined in a text description difference application programming interface (API) 206. The text description difference API 206 is configured to log a user purchase and purchase communications corresponding to an option purchased by the user. The text description difference API 206 is further configured to score a difference between the input response text descriptions and the different dataset types of the reference text descriptions and/or representations of the visual stimuli, in which a score is generated based on the plurality of different dataset types. In response, compiled code of a cognitive complexity score API 207 is configured to generate a complexity score representative of a cognitive complexity of the input response text description from the individual based on the score generated based on the different dataset types.

A run-time engine 208, which may be compiled code of a run-time framework, may be further accessible to the user monitoring application 202. The user monitoring application 202 may cause the run-time engine 208, for example, to take actions for generating a complexity score representative of a cognitive complexity of a response to visual stimuli. In response to detection of a visual perception difference from a predicted perception, the run-time engine 208 may in turn send a signal to an operating system 210, such as a Linux Kernel 212, running on the SOC 220. FIG. 2 illustrates the Linux Kernel 212 as software architecture for cognitive complexity measurement. It should be recognized, however, that aspects of the present disclosure are not limited to this exemplary software architecture. For example, other kernels may provide the software architecture to support cognitive complexity measurement functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Procedures for eliciting signals from humans for stimuli are essential to human-centered applications in multiple domains, including market research and design. One important signal is the complexity of the psychological process that arises when a person is presented with visual stimuli such as images, videos, virtual reality content, and physical artifacts. As described, complexity is defined as the extent to which an individual's psychological representation of a stimulus differs from a normative representation of the stimulus. Furthermore, cognitive complexity can provide insight into how people make decisions, ranging from the most minor to the most impactful.

Various aspects of the present disclosure are directed to a novel approach of inferring the complexity of processes associated with preference and decision making. Some aspects of the present disclosure measure the complexity of participant-generated descriptive features of consumer products and the relationship to preference rankings. These aspects of the present disclosure rely on a natural language processing approach that compares the descriptive words generated by participants to those generated by a machine learning model to measure cognitive complexity over a sparse set of features. For example, words that were more distinct from those generated by the model were rated more complex. These aspects of the present disclosure recognize that cognitive complexity is related to preference for products, explaining unique variance in rankings and also capturing a new facet of the process through which preference is revealed through choice.

Figure 3:
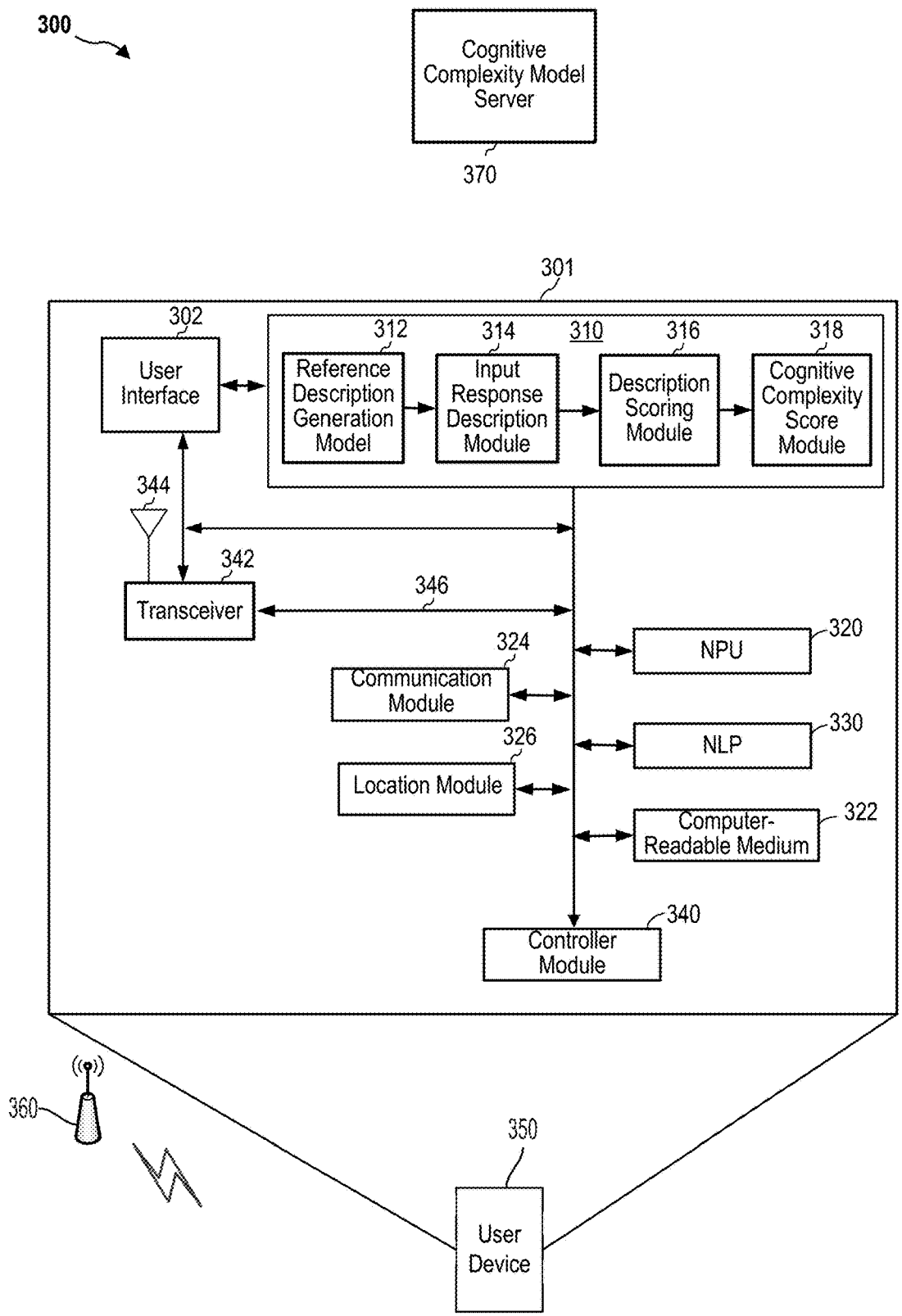
FIG. 3 is a diagram illustrating a hardware implementation for a cognitive complexity measurement system, according to aspects of the present disclosure.

FIG. 3 is a diagram illustrating a hardware implementation for a cognitive complexity measurement system 300, according to aspects of the present disclosure. The cognitive complexity measurement system 300 may be configured to quantitatively measure a psychological complexity of a user response to visual stimuli. The cognitive complexity measurement system 300 may be configured to generate different dataset types of reference text descriptions and/or representations of visual stimuli using a trained machine learning model. The cognitive complexity measurement system 300 may be configured to collect input response text descriptions from an individual after perceiving the visual stimuli.

In some aspects of the present disclosure, the cognitive complexity measurement system 300 may be configured to score a difference between the input response text descriptions and the different dataset types of the reference text descriptions and/or representations of the visual stimuli. For example, the different dataset types of the reference text descriptions and/or representations of the visual stimuli include a linguistic cognition dataset, a visual perception dataset, and other like datasets. In various aspects of the present disclosure, a score is generated based on the different dataset types, which may include a visual perception type, a linguistic cognition type, and an affect in language type. Additionally, the generated scores may include a visual perception score, a concept imagination score, an imagination complexity score, a description complexity score, a linguistic cognition score, a visual complexity score, and/or an affect in language cognition score. In these aspects of the present disclosure, the cognitive complexity measurement system 300 is configured to generate a complexity score representative of a cognitive complexity of the input response text description from the individual based on the score generated based on the different dataset types. For example, the cognitive complexity measurement system 300 may determine a cognitive complexity score for reacting to the visual stimuli according to the visual perception score, the linguistic cognition score, and/or the affect in language cognition score.

The cognitive complexity measurement system 300 includes a user monitoring system 301 and a cognitive complexity model server 370 in this aspect of the present disclosure. The user monitoring system 301 may be a component of a user device 350. The user device 350 may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a Smartbook, an Ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a global positioning system device, or any other suitable device that is configured to communicate via a wireless or wired medium.

The cognitive complexity model server 370 may connect to the user device 350 for providing cognitive complexity scores. For example, the cognitive complexity model server 370 may infer the complexity of processes associated with preference and decision making. In some aspects of the present disclosure, the cognitive complexity model server 370 measures the complexity of participant-generated descriptive features of consumer products and the relationship to preference rankings. These aspects of the present disclosure rely on a natural language processing approach (e.g., a natural language processor (NLP) 330) that compares the descriptive words generated by participants (e.g., an input response description module 314) to those generated by a machine learning model (e.g., a reference description generation model 312) to measure cognitive complexity over a sparse set of features. For example, words that were more distinct from those generated by the model (e.g., the reference description generation model 312) are rated as more complex.

The user monitoring system 301 may be implemented with an interconnected architecture, represented generally by an interconnect 346. The interconnect 346 may include any number of point-to-point interconnects, buses, and/or bridges depending on the specific application of the user monitoring system 301 and the overall design constraints. The interconnect 346 links together various circuits including one or more processors and/or hardware modules, represented by a user interface 302, a visual perception module 310, a neutral network processor (NPU) 320, a computer-readable medium 322, a communication module 324, a location module 326, a natural language processor (NLP) 330, and a controller module 340. The interconnect 346 may also link various other circuits such as timing sources, peripherals, voltage regulators, and power management circuits, which are well known in the art, and therefore, will not be described any further.

The user monitoring system 301 includes a transceiver 342 coupled to the user interface 302, the visual perception module 310, the NPU 320, the computer-readable medium 322, the communication module 324, the location module 326, the NLP 330, and the controller module 340. The transceiver 342 is coupled to an antenna 344. The transceiver 342 communicates with various other devices over a transmission medium. For example, the transceiver 342 may receive commands via transmissions from a user or a connected vehicle. In this example, the transceiver 342 may receive/transmit information for the visual perception module 310 to/from connected devices within the vicinity of the user device 350.

The user monitoring system 301 includes the NPU 320 coupled to the computer-readable medium 322. The NPU 320 performs processing, including the execution of software stored on the computer-readable medium 322 to provide a neural network model for user monitoring and advice recommendation functionality according to the present disclosure. The software, when executed by the NPU 320, causes the user monitoring system 301 to perform the various functions described for purchase monitoring and advice recommendation through the user device 350, or any of the modules (e.g., 310, 324, 326, 330, and/or 340). The computer-readable medium 322 may also be used for storing data that is manipulated by the NLP 330 when executing the software to analyze user communications.

The location module 326 may determine a location of the user device 350. For example, the location module 326 may use a global positioning system (GPS) to determine the location of the user device 350. The location module 326 may implement a dedicated short-range communication (DSRC)-compliant GPS unit. A DSRC-compliant GPS unit includes hardware and software to make the autonomous vehicle 350 and/or the location module 326 compliant with the following DSRC standards, including any derivative or fork thereof: EN 12253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the user device 350 that are not modules of the user monitoring system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The user monitoring system 301 also includes the NLP 330 to perform a natural language processing approach that compares the descriptive words generated by participants (e.g., the input response description module 314) to those generated by a machine learning model (e.g., the reference description generation model 312). In various aspects of the present disclosure, the NLP 330 measures a cognitive complexity over a sparse set of features. For example, words that were more distinct from those generated by the model (e.g., the reference description generation model 312) are rated as more complex. For example, the NLP 330 may assist in determining a cognitive complexity score for reacting to the visual stimuli according to a visual perception score, a linguistic cognition score, and/or an affect in language cognition score.

In aspects of the present disclosure, the NLP 330 is used if the descriptions are conducted in plain text. The user monitoring system 301, however, may receive and analyze the data log to determine the user's response to visual stimuli. In these aspects of the present disclosure, the communications are a sequence of data logs (e.g., iterative searching process, selected filters, questionnaires). These communications may not be text but can be useful data to help determine a user's cognitive response to visual stimuli. These aspects of the present disclosure analyze non-language communications (e.g., those mentioned above) using machine learning models to determine factors in the user's cognitive response to visual stimuli.

The visual perception module 310 may be in communication with the user interface 302, the NPU 320, the computer-readable medium 322, the communication module 324, the location module 326, the NLP 330, the controller module 340, and the transceiver 342. In one configuration, the visual perception module 310 monitors communications from the user interface 302. The user interface 302 may monitor user communications to and from the communication module 324. According to aspects of the present disclosure, the NLP 330 may use natural language processing to extract terms from communications regarding user purchase, such as terms revealing that loss aversion was a factor in a user purchase process.

As shown in FIG. 3, the visual perception module 310 includes the reference description generation model 312, the input response description module 314, a description scoring module 316, and a cognitive complexity score module 318. The reference description generation model 312, the input response description module 314, the description scoring module 316, and the cognitive complexity score module 318 may be components of a same or different artificial neural network, such as a deep convolutional neural network (CNN). The visual perception module 310 is not limited to a CNN. The visual perception module 310 may be configured to quantitatively measure a psychological complexity of a user response to visual stimuli received from the user interface 302.

This configuration of the visual perception module 310 includes the reference description generation model 312 to provide a trained machine learning model for generating different dataset types of reference text descriptions and/or representations of visual stimuli. The visual perception module 310 also includes the input response description module 314 for collecting input response text descriptions from an individual after perceiving the visual stimuli. The visual perception module 310 also includes the description scoring module 316 for scoring a difference between the input response text descriptions and the different dataset types of the reference text descriptions and/or representations of the visual stimuli, in which a score is generated based on the different dataset types. The visual perception module 310 further includes the cognitive complexity score module 318 for generating a complexity score representative of a cognitive complexity of the input response text description from the individual based on the score generated based on the plurality of different dataset types.

In some aspects of the present disclosure, the description scoring module 316 generates scores based on the different dataset types, which may include a visual perception type, a linguistic cognition type, and an affect in language type. Additionally, the generated scores may include a visual perception score, a linguistic cognition score, and/or an affect in language cognition score. In these aspects of the present disclosure, the cognitive complexity score module 318 is configured to generate a complexity score representative of a cognitive complexity of the input response text description from the individual based on the score generated based on the different dataset types. For example, the cognitive complexity score module 318 may determine a cognitive complexity score for reacting to the visual stimuli according to the visual perception score, the linguistic cognition score, and/or the affect in language cognition score. In some aspects of the present disclosure, the visual perception module 310 may be implemented and/or work in conjunction with the cognitive complexity model server 370, for example, as shown in FIG. 4.

Figure 4:
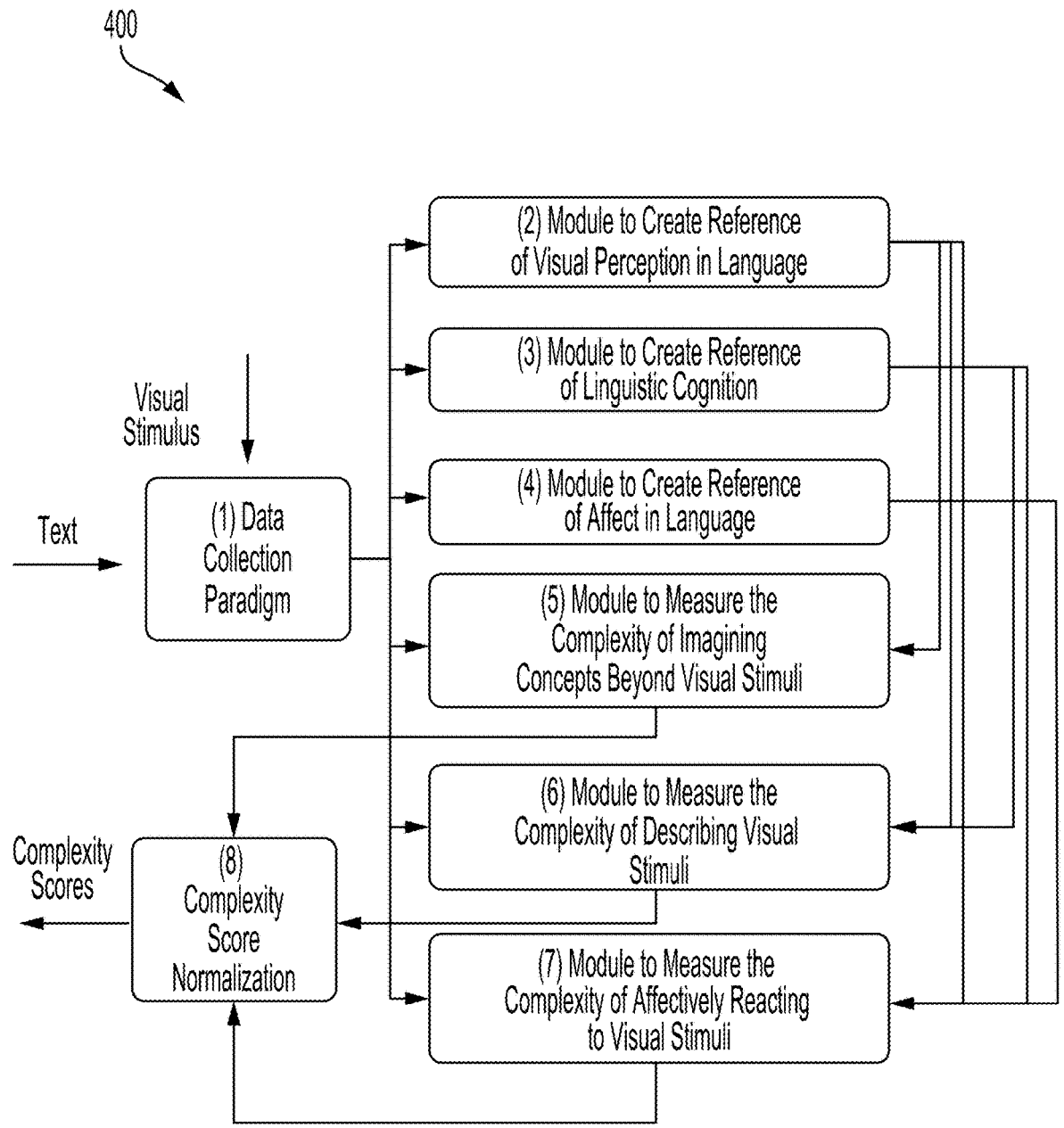
FIG. 4 is a block diagram further illustrating a cognitive complexity measurement system, in accordance with aspects of the present disclosure.

FIG. 4 is a block diagram further illustrating a cognitive complexity measurement system 400, in accordance with aspects of the present disclosure. In various aspects of the present disclosure, the cognitive complexity measurement system 400 is configured to quantitatively measure a psychological complexity of a person's response to visual stimuli. In this configuration, the cognitive complexity measurement system 400 includes a data collection paradigm (1) that can collect text generated by a user where the user generated text is elicited for a given visual stimulus. Additionally, a visual perception reference model (2) is configured to generate a reference text corpus of corresponding visual content, in which each piece of text can be mapped to certain perceptual attributes or concepts. The visual perception reference model (2) can be, but is not limited to, a visual description generation model or a visual-text grounding model or a joint-embedding model trained by a large set of descriptions for visual content, for example, as shown in FIG. 5.

Figure 5:
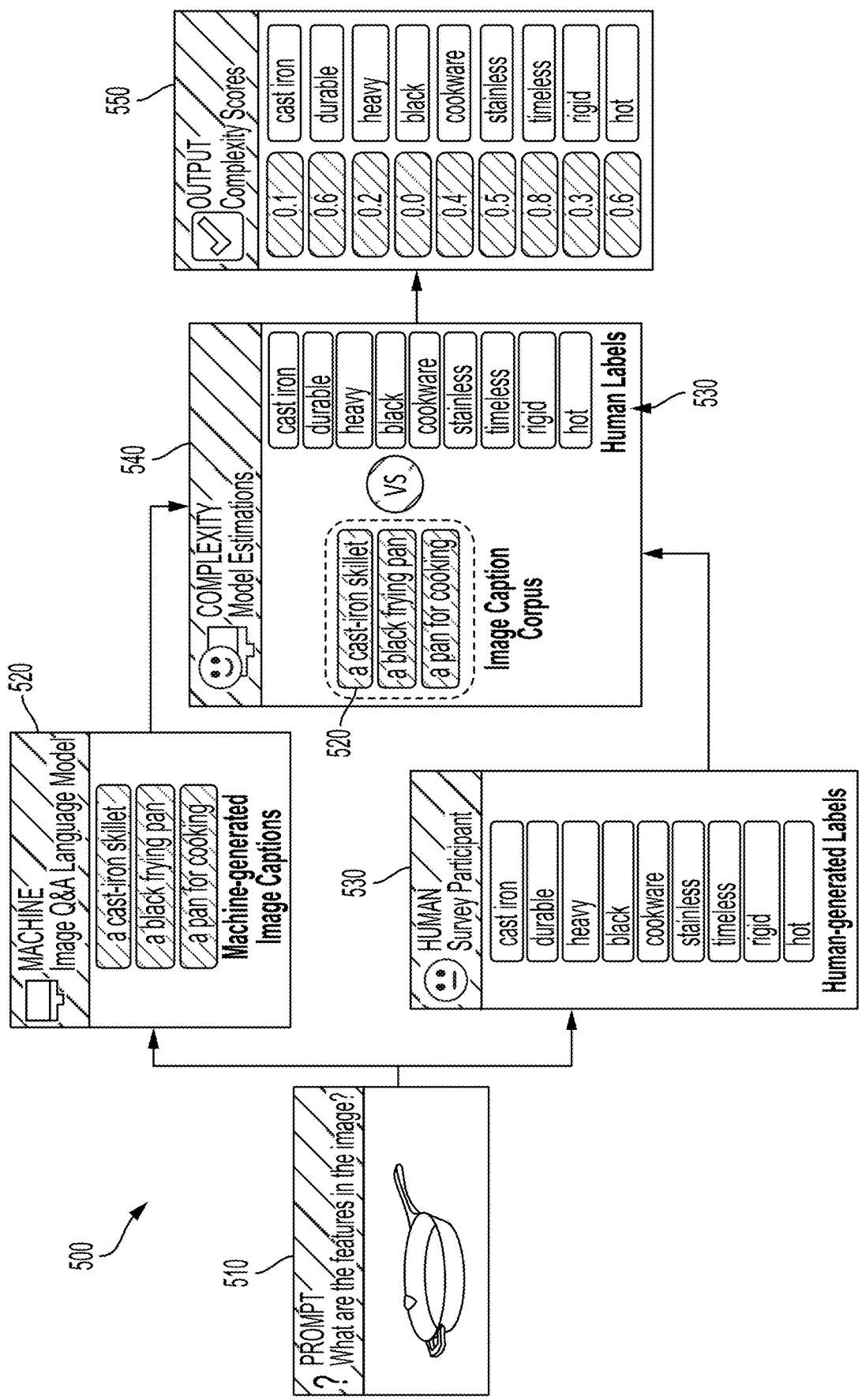
FIG. 5 is a block diagram illustrating computing of cognitive complexity of human-generated text using machine learning, in accordance with various aspects of the present disclosure.

FIG. 5 is a block diagram 500 illustrating computing of cognitive complexity of human-generated text using machine learning, in accordance with various aspects of the present disclosure. Various aspects of the present disclosure recognize the many facets of cognitive complexity and take a broad view of the construct. These aspects of the present disclosure define cognitive complexity as the additional context necessary to understand human-generated language in response to a visual stimulus. Additionally, context is defined as the information about a visual stimulus that is not retrievable from the visual features by an observer such as imagination inspired by the visual stimulus; for example, "watching videos" (imagination) when seeing a product image "couch" (visual feature). While the human-generated language can be analyzed by psychological models and language analysis tools, the analysis also involves understanding of visual features in the stimulus and, hence, specifies a new measure built on both vision and language understanding.

In various aspects of the present disclosure, a vision and language model is used to generate a corpus as a reference of information that can be observed in a given image. In various aspects of the present disclosure, the vision and language model is a neural network model pre-trained by a set of vision and language datasets to serve a variety of downstream tasks such as text-to-image grounding, visual question answering, and image captioning, as shown in FIG. 5. Given the nature of these human annotations in the training data, the vision and language model can generate visual description that can be observed in a given image.

For example, FIG. 5 illustrates machine-generated image captions 520, including sample visual descriptions generated by a consumer product image 510 (e.g., a cast iron skillet). These machine-generated image captions 520 become a reference corpus of normative descriptions for the consumer product image 510 and are, therefore, a reasonable comparison set for features generated by an individual. According to aspects of the present disclosure, if the model generates a word, it is more likely to be commonly used and, by definition, is less complex. The process may or may not need to be curated manually.

Referring again to FIG. 4, a linguistic cognition model (3) is configured to create a reference text corpus, in which each piece of text is associated with different levels of linguistic cognitive capability, such as textbooks or other educational materials designed for different qualification levels. The linguistic cognition model (3) can be, but is not limited to, a text generation model or a text embedding model trained by a large set of text conditioned on cognitive capability to generate new text conditioned on cognitive capability or to annotate existing text with cognitive capability. The process may or may not need to be curated manually.

An affect in language model (4) is configured to create a reference text corpus where each piece of text is associated with different levels of affective states such as positive/negative affect or basic emotions. The affect in language model (4) can be but is not limited to a text generation model or a text embedding model trained by a large set of text associated with affective states to generate new text conditioned on affective states or to annotate existing text with affective states. The process may or may not need to be curated manually.

For example, as shown in FIG. 5, the following prompt is indicated: "what are the features of the image?" In this example, a cast iron skillet is shown as the consumer product image 510. In response to the prompt, the visual perception reference model (2), the linguistic cognition model (3), and/or the affect in language model (4) provide machine-generated image captions 520. In this example, the machine-generated image captions 520 include a cast-iron skillet, a black frying pan, and a pan for cooking. By contrast, human-generated labels 530 include: cast iron, durable, heavy, black, cookware, stainless, timeless, rigid, and hot.

Referring again to FIG. 4, the cognitive complexity measurement system 400 includes an imagination complexity measurement module (5) to quantitatively measure "the complexity with which humans imagine concepts beyond the visual stimuli" via the user generated text. For example, as shown in FIG. 5, the human-generated labels 530 may be elicited for a consumer product image 510 by the data collection paradigm (1). In various aspects of the present disclosure, the imagination complexity measurement module (5) back projects the human-generated labels 530 to an embedding space created by the visual perception reference model (2). In these aspects of the present disclosure, the embedding space serves as the reference of the level that a given piece of text can be perceived in certain visual content.

Referring again to FIG. 4, the cognitive complexity measurement system 400 includes a visual complexity measurement module (6) to quantitatively measure "the complexity with which humans describe the visual stimuli" via the user generated text. For example, as shown in FIG. 5, the human-generated labels 530 may be elicited for the consumer product image 510 by the data collection paradigm (1). In various aspects of the present disclosure, the visual complexity measurement module (6) back projects the human-user label to separate or combine embedding spaces created by the visual perception reference model (2) and/or the linguistic cognition model (3). In various aspects of the present disclosure, the embedding spaces serve as a reference of the level that a given piece of text can be perceptually and cognitively grounded in certain visual content.

As further illustrated in FIG. 4, the affect complexity measurement module (7) to quantitatively measure "the complexity of humans' affective linguistic responses to the visual stimuli" via the user generated text. For example, as shown in FIG. 5, the human-generated labels 530 may be elicited for the consumer product image 510 by the data collection paradigm (1). In various aspects of the present disclosure, the affect complexity measurement module (7) back projects the human-generated labels 530 to separate or combine embedding spaces created by the visual perception reference model (2), the linguistic cognition model (3), and/or the affect in language model (4). In various aspects of the present disclosure, the embedding spaces serve as the reference of the level that a given piece of text can be perceptually and affectively associated with certain visual content.

Referring again to FIG. 4, the cognitive complexity measurement system 400 includes a complexity score normalization module (8) to map the quantitative measures of psychological complexity computed in the imagination complexity measurement module (5), the visual complexity measurement module (6), and the affect complexity measurement module (7) to a normalized scale of scores. In various aspects of the present disclosure, the normalization may be influenced by the populations or the stimuli of interest. In these aspects of the present disclosure, a complexity score from the complexity score normalization module (8) provides a quantitative measure of a psychological complexity of a user response to the consumer product image 510.

Referring again to FIG. 5, computing cognitive complexity is performed by calculating an overlap between a feature generated by a human and a reference corpus generated by a machine learning model for the same given image. Lower overlap between a feature with the reference corpus suggests that more context beyond the given image is required to understand the feature, hence the feature has higher complexity. A flowchart of computing complexity scores is presented in FIG. 5. First, the machine learning model is given an image (e.g., the consumer product image 510) and a text prompt to generate a set of image captions (e.g., machine-generated image captions 520) as the reference corpus. The same image and text prompts are shown to a human participant to elicit text labels (e.g., human-generated labels 530). In this example, a complexity comparison 540 is performed between the machine-generated image captions 520 and the human-generated labels 530. In various aspects of the present disclosure, a complexity score assignment 550 assigns complexity scores to the human-generated labels 530 using the following formula:

$$1 - (\text{overlap}/\max(\text{overlap}, \text{cap})) \quad (1)$$

where overlap is the number of times the human label appears in the machine-generated image captions 520 and cap is between 1 and the number of total words in the machine-generated image captions 520 for regularization that prevents the value from vanishing in a large corpus. The cognitive complexity measurement system 400 may engage in a process, for example, as shown in FIG. 6.

Figure 6:
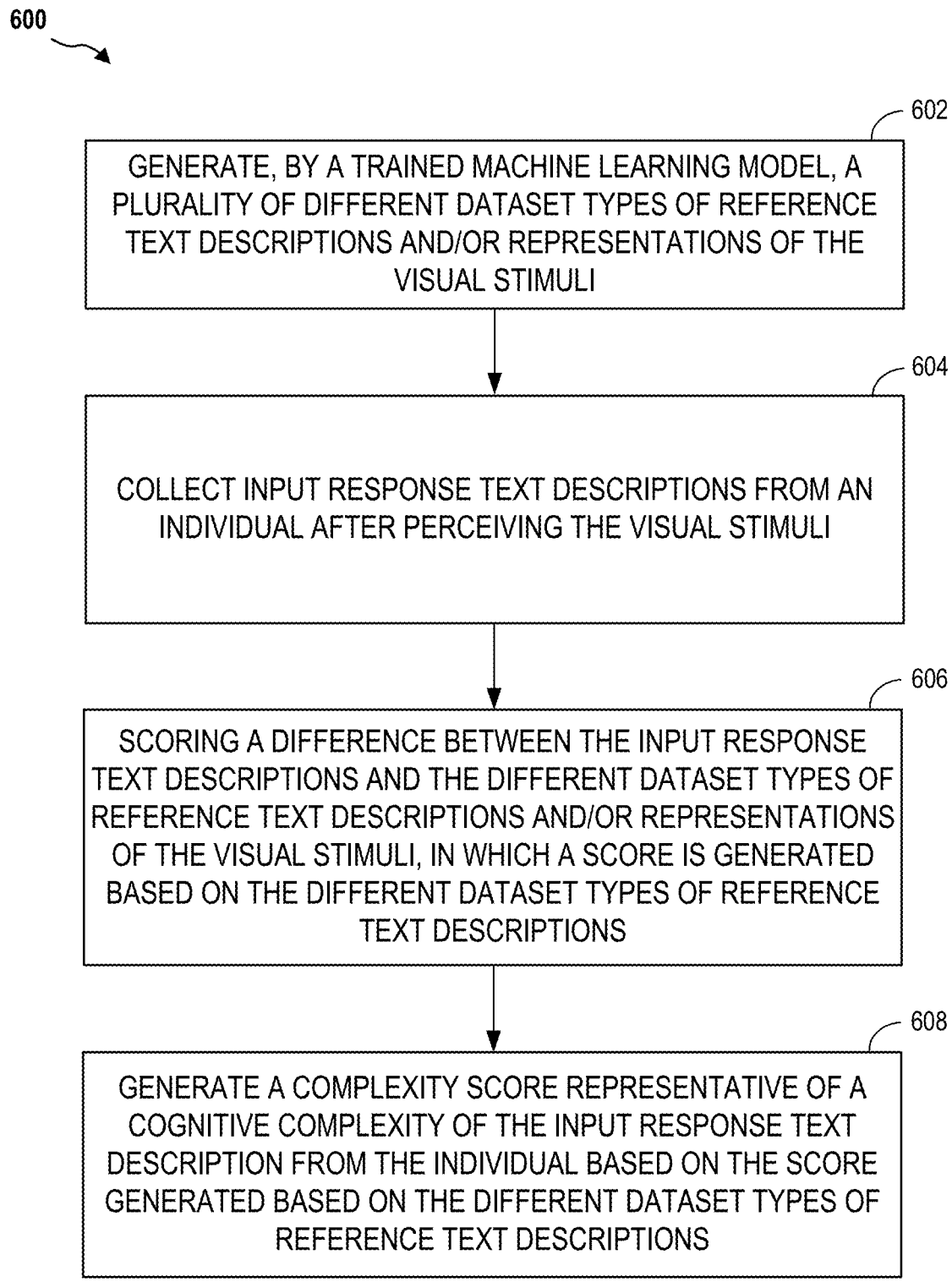
FIG. 6 is a flowchart illustrating a method for monitoring user decision making activity, according to aspects of the present disclosure.

FIG. 6 is a flowchart illustrating a method for method for quantitatively measuring a psychological complexity of a response to visual stimuli, according to aspects of the present disclosure. A method 600 begins at block 602, in which a trained machine learning model generate different dataset types of reference text descriptions and/or representations of the visual stimuli. For example, as shown in FIG. 3, the visual perception module 310 includes the reference description generation model 312 to provide a trained machine learning model for generating different dataset types of reference text descriptions and/or representations of visual stimuli. FIG. 5 illustrates machine-generated image captions 520, including sample visual descriptions generated by a consumer product image 510 (e.g., a cast iron skillet). These machine-generated image captions 520 become a reference corpus of normative descriptions for the consumer product image 510 and are, therefore, a reasonable comparison set for features generated by an individual.

At block 604, input response text descriptions are collected from an individual after perceiving the visual stimuli. For example, as shown in FIG. 3, the visual perception module 310 also includes the input response description module 314 for collecting input response text descriptions from an individual after perceiving the visual stimuli. As shown in FIG. 4, the cognitive complexity measurement system 400 includes a data collection paradigm (1) that can collect text generated by a user where the user generated text is elicited for a given visual stimulus. For example, as shown in FIG. 5, the human-generated labels 530 may be elicited for the consumer product image 510 by the data collection paradigm (1).

At block 606, a difference between the input response text descriptions and the different dataset types of reference text descriptions and/or representations of the visual stimuli is scored, in which a score is generated based on the different dataset types of reference text descriptions. For example, as shown in FIG. 3, the description scoring module 316 generates scores based on the different dataset types, which may include a visual perception type, a linguistic cognition type, and an affect in language type. The visual perception module 310 includes the description scoring module 316 for scoring a difference between the input response text descriptions and the different dataset types of the reference text descriptions and/or representations of the visual stimuli, in which a score is generated based on the different dataset types.

At block 608, a complexity score representative of a cognitive complexity of the input response text description from the individual based on the score generated based on the different dataset types of reference text descriptions. For example, as shown in FIG. 4, a complexity score from the complexity score normalization module (8) provides a quantitative measure of a psychological complexity of a user response to the consumer product image 510. As shown in FIG. 5, a complexity score assignment 550 assigns complexity scores to the human-generated labels 530 using Equation (1).

Various aspects of the present disclosure are directed to a machine learning based approach to quantitatively measure the psychological complexity in at least three perspectives: (1) how well humans can imagine concepts beyond the visual stimuli, (2) the complexity of human's descriptions of visual stimuli, and (3) the scope of affective information contained in the language used in descriptions of visual stimuli. In particular, various aspects of the present disclosure are directed to a system designed to quantify the complexity of human psychological processes elicited by visual stimuli using a machine learning-based approach. In these various aspects of the present disclosure, metrics generated by the system allow the user to make inference about how a human understands the visual world.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for quantitatively measuring a psychological complexity of a response to visual stimuli, comprising:
generating, by a trained machine learning model, a plurality of different dataset types of reference text descriptions and/or representations of a consumer product image;
collecting input response text descriptions from an individual after perceiving the consumer product image;
scoring, using a natural language processor, a difference between the input response text descriptions and the plurality of different dataset types of reference text descriptions and/or representations of the consumer product image, in which a score is generated based on the plurality of different dataset types of reference text descriptions; and
assigning a complexity score to a consumer product representative of a cognitive complexity of the input response text description from the individual based on the score generated based on the plurality of different dataset types of reference text descriptions of the consumer product image.

2. The method of claim 1, in which scoring comprises:
measuring the difference between the input response text descriptions and a visual perception dataset of the reference text descriptions of the consumer product image to provide a visual perception score; and
determining an imagination complexity score for imagining concepts beyond the consumer product image according to the visual perception score.

3. The method of claim 1, in which scoring comprises:
measuring the difference between the input response text descriptions and a visual perception dataset of the reference text descriptions and/or representations of the consumer product image to provide a concept imagination score;
measuring the difference between the input response text descriptions and a linguistic cognition dataset of the reference text descriptions and/or representations of the consumer product image to provide a linguistic cognition score; and
determining a description complexity score for describing the consumer product image according to the concept imagination score and the linguistic cognition score.

4. The method of claim 1, in which scoring comprises:
measuring the difference between the input response text descriptions and a visual perception dataset of the reference text descriptions and/or representations of the consumer product image to provide a concept imagination score;
measuring the difference between the input response text descriptions and a linguistic cognition dataset of the reference text descriptions and/or representations of the consumer product image to provide a visual complexity score;
measuring the difference between the input response text descriptions and an affect in language dataset of the reference text descriptions and/or representations of the consumer product image to provide an affect in language cognition score; and
determining a cognitive complexity score for reacting to the consumer product image according to the concept imagination score, the visual complexity score, and the affect in language cognition score.

5. The method of claim 1, in which scoring comprises:
determining an overlap between each of the input response text descriptions and the plurality of different dataset types of reference text descriptions and/or representations of the consumer product image; and
assigning the score to each of the input response text descriptions based on the determined overlap between each of the input response text descriptions and the plurality of different dataset types of reference text descriptions and/or representations of the consumer product image.

6. The method of claim 5, in which determining the overlap comprises analyzing, using a natural language processor, the determined overlap between each of the input response text descriptions and the plurality of different dataset types of reference text descriptions and/or representations of the consumer product image.

7. The method of claim 1, in which training the plurality of different dataset types of reference text descriptions comprises a visual perception type, a linguistic cognition type, and an affect in language type.

8. The method of claim 1, in which generating the complexity score comprises normalizing an imagination complexity score for imagining concepts beyond the consumer product image, a description complexity score for describing the consumer product image, and an affect complexity score for reacting to the consumer product image.

9. A non-transitory computer-readable medium having program code recorded thereon for quantitatively measuring a psychological complexity of a response to visual stimuli, the program code being executed by a processor and comprising:
   program code to generate, by a trained machine learning model, a plurality of different dataset types of reference text descriptions and/or representations of a consumer product image;
   program code to collect, using a natural language processor, input response text descriptions from an individual after perceiving the consumer product image;
   program code to score a difference between the input response text descriptions and the plurality of different dataset types of reference text descriptions and/or representations of the consumer product image, in which a score is generated based on the plurality of different dataset types of reference text descriptions; and
   program code to assign a complexity score representative of a cognitive complexity of the input response text description from the individual based on the score generated based on the plurality of different dataset types of reference text descriptions.

10. The non-transitory computer-readable medium of claim 9, in which the program code to score comprises:
    program code to measure the difference between the input response text descriptions and a visual perception dataset of the reference text descriptions of the consumer product image to provide a visual perception score; and
    program code to determine an imagination complexity score for imagining concepts beyond the consumer product image according to the visual perception score.

11. The non-transitory computer-readable medium of claim 9, in which the program code to score comprises:
    program code to measure the difference between the input response text descriptions and a visual perception dataset of the reference text descriptions and/or representations of the consumer product image to provide a concept imagination score;
    program code to measure the difference between the input response text descriptions and a linguistic cognition dataset of the reference text descriptions and/or representations of the consumer product image to provide a linguistic cognition score; and
    determining a description complexity score for describing the consumer product image according to the concept imagination score and the linguistic cognition score.

12. The non-transitory computer-readable medium of claim 9, in which the program code to score comprises:
    program code to measure the difference between the input response text descriptions and a visual perception dataset of the reference text descriptions and/or representations of the consumer product image to provide a concept imagination score;
    program code to measure the difference between the input response text descriptions and a linguistic cognition dataset of the reference text descriptions and/or representations of the consumer product image to provide a visual complexity score;
    program code to measure the difference between the input response text descriptions and an affect in language dataset of the reference text descriptions and/or representations of the consumer product image to provide an affect in language cognition score; and
    program code to determine a cognitive complexity score for reacting to the consumer product image according to the concept imagination score, the visual complexity score, and the affect in language cognition score.

13. The non-transitory computer-readable medium of claim 9, in which the program code to score comprises:
    program code to determine an overlap between each of the input response text descriptions and the plurality of different dataset types of reference text descriptions and/or representations of the consumer product image; and
    program code to assign the score to each of the input response text descriptions based on the determined overlap between each of the input response text descriptions and the plurality of different dataset types of reference text descriptions and/or representations of the consumer product image.

14. The non-transitory computer-readable medium of claim 13, in which the program code to determine the overlap comprises program code to analyze, using a natural language processor, the determined overlap between each of the input response text descriptions and the plurality of different dataset types of reference text descriptions and/or representations of the consumer product image.

15. The non-transitory computer-readable medium of claim 9, in which the program code to train the plurality of different dataset types of reference text descriptions comprises a visual perception type, a linguistic cognition type, and an affect in language type.

16. The non-transitory computer-readable medium of claim 9, in which the program code to generate the complexity score comprises program code to normalize an imagination complexity score for imagining concepts beyond the consumer product image, a description complexity score for describing the consumer product image, and an affect complexity score for reacting to the consumer product image.

17. A system for quantitatively measuring a psychological complexity of a response to visual stimuli, the system comprising:
    a reference description generation model to generate a plurality of different dataset types of reference text descriptions and/or representations of a consumer product image;
    an input response description module to collect, using a natural language processor, input response text descriptions from an individual after perceiving the consumer product image;
    a description scoring module to score a difference between the input response text descriptions and the plurality of different dataset types of reference text descriptions and/or representations of the consumer product image, in which a score is generated based on the plurality of different dataset types of reference text descriptions; and
    a cognitive complexity score module to assign a complexity score representative of a cognitive complexity of the input response text description from the individual based on the score generated based on the plurality of different dataset types of reference text descriptions.

18. The system of claim 17, in which the description scoring module is further to determine an overlap between each of the input response text descriptions and the plurality of different dataset types of reference text descriptions and/or representations of the consumer product image, and to assign the score to each of the input response text descriptions based on the determined overlap between each of the input response text descriptions and the plurality of different dataset types of reference text descriptions and/or representations of the consumer product image.

19. The system of claim 18, in which the natural language processor is further to analyze the determined overlap between each of the input response text descriptions and the plurality of different dataset types of reference text descriptions and/or representations of the consumer product image.

20. The system of claim 17, in which the cognitive complexity score module is further to normalize an imagination complexity score for imagining concepts beyond the consumer product image, a description complexity score for describing the consumer product image, and an affect complexity score for reacting to the consumer product image.

\* \* \* \* \*